United States Patent

[11] 3,546,405

| [72] | Inventor | Raymond Carignan<br>94 W. Main St., Stafford Springs,<br>Connecticut 06076 |
|---|---|---|
| [21] | Appl. No. | 788,218 |
| [22] | Filed | Dec. 31, 1968 |
| [45] | Patented | Dec. 8, 1970 |

[54] FLUID FLOW DETECTOR
14 Claims, 6 Drawing Figs.

[52] U.S. Cl..................................................... 200/82,
200/82, 137/557
[51] Int. Cl...................................................... H01h 35/24
[50] Field of Search............................... 200/81, 82, 82(A);
340/220; 137/557

[56] References Cited
UNITED STATES PATENTS
2,239,348 4/1941 Wirtanen et al. ............. 200/82(.3)

| 2,335,073 | 11/1943 | Martin et al. .................. | 200/82 |
| 2,965,730 | 12/1960 | Regoli et al. ................... | 200/82(.3) |
| 3,194,608 | 7/1965 | Rich.............................. | 200/82(.3)X |

Primary Examiner—Robert K. Schaefer
Assistant Examiner—J. R. Scott
Attorney—Fishman and Van Kirk ABSTRACT: Electromechanical devices sensitive to fluid flow rate or pressure are disclosed. These detector devices are characterized by a pair of oppositely disposed, electrically conductive, differential area piston members which are exposed to the fluid flow to be monitored. The flow rate at which the separating bias on the pistons is overcome and the members caused to contact one another to thereby provide an indication of abnormal flow is adjustable via valve means in the devices. The devices may also be made responsive to both under and over pressure or flow rates.

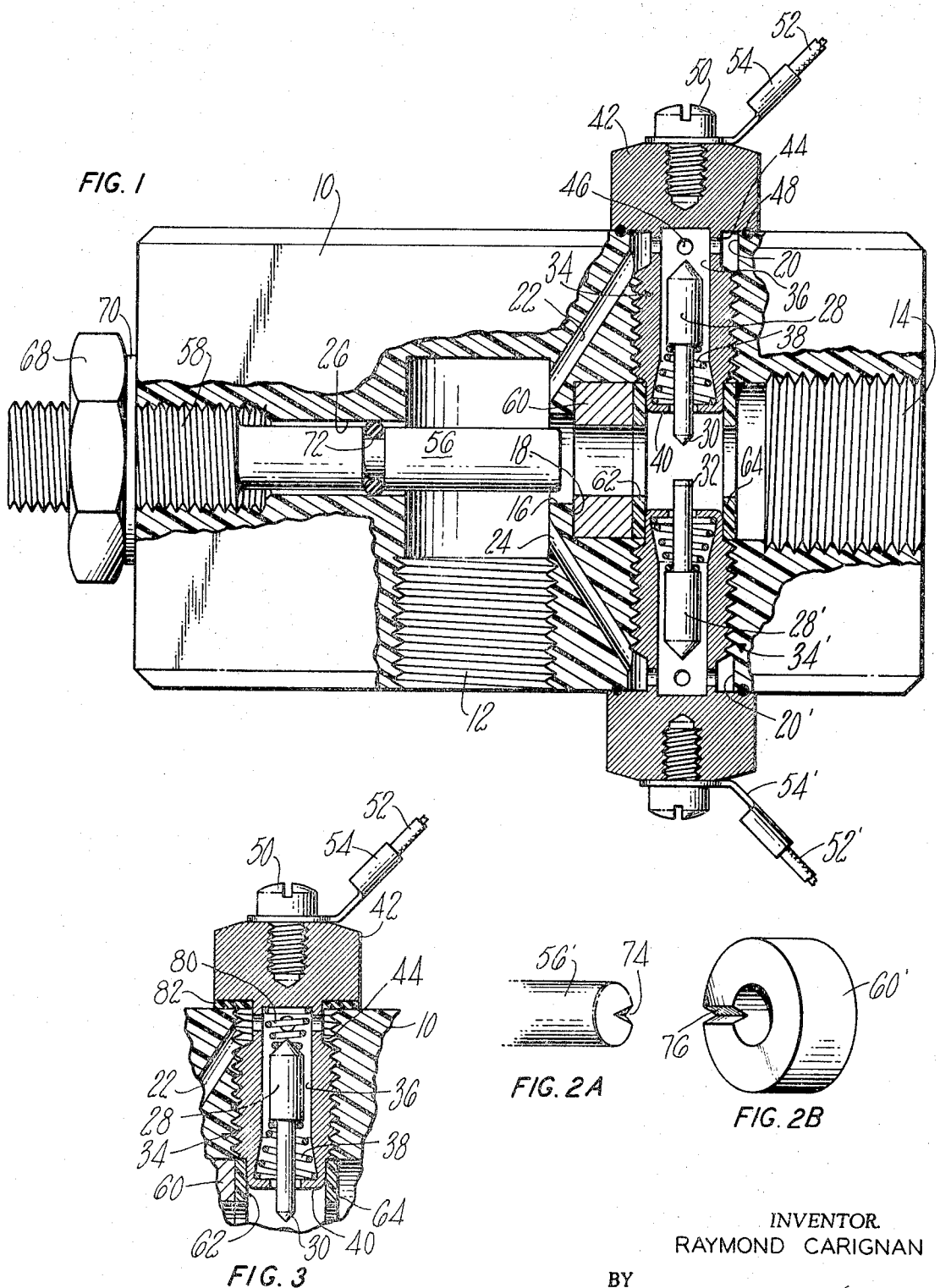

PATENTED DEC 8 1970

INVENTOR.
RAYMOND CARIGNAN

BY Fishman and VanKirk

ATTORNEYS

FLUID FLOW DETECTOR

BACKGROUND OF THE INVENTION

1. Field of the Invention

The present invention relates to the detection of fluid flow rates and/or pressures outside of a normal operating range. More specifically, the present invention is directed to detector devices which alter the state of an electrical circuit in response to fluid flow rates less than and/or in excess of preselected maximum and/or minimum values. Accordingly, the general objects of the present invention are to provide novel and improved methods and apparatus of such character.

2. Description of the Prior Art

Devices are known for detecting and providing an indication of changes in pressure or flow rate in fluid systems. An example of such a prior art device may be found in U.S. Pat. No. 2,826,754 issued to the present applicant on Mar. 11, 1958. Devices as exemplified by that shown in U.S. Pat. No. 2,826,754, while employed successfully, have been somewhat lacking in sensitivity and speed of response.

SUMMARY OF THE INVENTION

The present invention overcomes the foregoing and other deficiencies of the prior art and in so doing provides novel and improved methods of and apparatus for abnormal flow rates and/or pressures.

In accomplishing the foregoing general objective, the present invention includes a housing through which all or a portion of the circulating fluid under surveillance will flow. Disposed in cylinders provided therefor in the housing of the present invention are a pair of oppositely disposed, differential area pistons. By means of suitable passages in the housing, the system fluid is in contact with the opposite sides of both pistons, the pistons being normally biased away from one another. The housing is also provided with a valve for adjusting the flow to the facing ends of the pistons whereby the flow rate at which the biasing will be overcome and the facing ends of the pistons caused to contact one another may be selected. Closing of the gap between the pistons will alter an electrical circuit to provide an indication of abnormally low flow rate. The housing of the present detector devices may also be provided with one or more second electrical contact means which extend into the cylinders and face the opposite ends of the pistons. Flow rates below a preselected level will cause a piston to contact such a second contact. The degree of extension of the second contacts into the cylinders is adjustable to provide selection of the operating point below normal flow rates.

BRIEF DESCRIPTION OF THE DRAWING

The present invention may be better understood and its numerous advantages will become apparent to those skilled in the art by reference to the accompanying drawing wherein like reference numerals refer to like elements in the various figures and in which:

FIG. 1 is a side elevation view, partly in section, of a first embodiment of the present invention;

FIG. 2A is an enlarged, perspective view of a valve stem which may be employed in the embodiment of FIG. 1;

FIG. 2B is an enlarged, perspective view of a valve seat which may be employed in the embodiment of FIG. 1;

FIG. 3 is a cross-sectional, side elevation view of a modified contact assembly which may be employed in the embodiment of FIG. 1;

DESCRIPTION OF THE PREFERRED EMBODIMENTS

Figure 4:
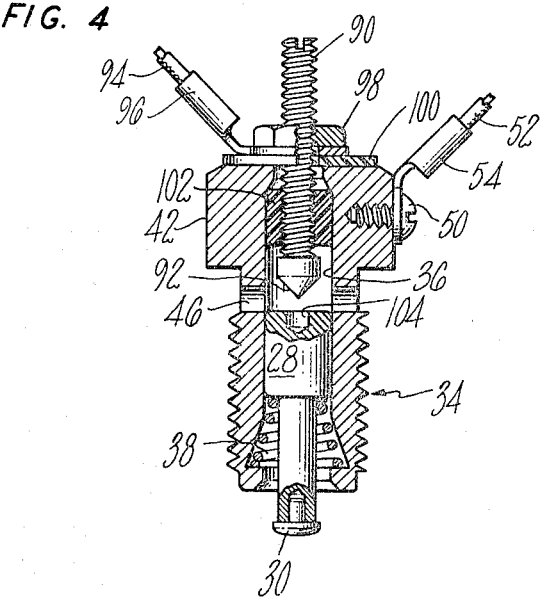
FIG. 4 is a cross-sectional, side elevation view of a third form of contact assembly which may be employed in the embodiment of FIG. 1.

With reference now to FIG. 1, a partial, cross-sectional view of a flow-sensitive device in accordance with the present invention is shown. The embodiment of FIG. 1 comprises a housing or casing 10 which, in the usual instance, will be formed of a nonconductive material such as nylon. Casing 10 is provided with an inlet port 12 and an exit port 14, ports 12 and 14 being internally threaded adjacent their outer terminations as shown so as to permit installation of the casing in a conduit system. In the preferred embodiment shown in FIG. 1, ports 12 and 14 extend into casing 10 a substantial distance and have their axes transversely oriented. Exit port 14, at its inwardly disposed end, communicates with port 12 via an axially alined passage 16 having a diameter less than that of the inlet and exit ports. Passage 16 defines an annular shoulder 18, the purpose of which will be described in detail below.

Casing 10 also has a bore 20 extending completely therethrough, bore 20 intersecting the exit port 14 and having its axis parallel with the axis of inlet port 12. Bore 20 is internally threaded adjacent the outer extremities thereof so as to permit installation of electrical contact assemblies therein. The opposite ends of bore 20 are placed in communication with inlet port 12 via angularly oriented, small diameter passages 22 and 24 which are also formed in casing 10. As may be seen, passages 22 and 24 branch outwardly from the inner or unthreaded end of inlet port 12 and terminate adjacent respective outer ends of bore 20.

In order to permit installation of a control valve mechanism therein, casing 10 is provided with an additional bore 26 which extends inwardly from the end of the casing opposite to that which defines the outer periphery of exit port 14. Bore 26 is axially alined with exit port 14 and intersects and thus is in communication with inlet port 12.

In the embodiment of FIG. 1, the contact assemblies comprise conductive outer members 34 and 34' which threadably engage the walls of bore 20 in casing 10. Conductive members 34 are partially of cylindrical shape thereby defining, at the interior of their inwardly disposed portions, cylinders 36 in which differential area pistons 28 and 28' are disposed. Pistons 28 and 28' are biased away from one another and toward the opposite ends of cylinders 36 by springs 38 which, like the pistons, are formed from a suitable conductive material. Springs 38 are disposed in the inwardly situated ends of cylinders 36 in members 34 and 34', the said inwardly disposed ends of cylinders 36 being slightly tapered outwardly to form a cylinder section of increasing diameter. The springs 38 are maintained in position by the folded over inner ends 40 of members 34. The ends 40 of members 34 are apertured so that the smaller diameter ends of the pistons 28 may pass therethrough. The other ends of springs 38, that is the ends which do not rest on ends 40 by members 34, engage the shoulder on each of pistons 28 defined by the junction of the smaller and larger diameter piston sections. It is to be noted that springs 38 are of helical shape and thus are complementary to and maintained in position by the tapered outer end portions of the cylinders 36.

At the other end of members 34, and between the threaded side wall portions thereof and the contact assembly heads 42, members 34 are provided with a comparatively thin-walled section 44. As a result of the reduced outer diameter of section 44 of member 34, annular chambers in communication with the ends of passages 22 and 24 are defined. Section 44 of members 34 are also provided with a plurality of holes whereby the aforementioned annular chamber is in communication with the interior of cylinders 36 and thus permitting the system fluid to act on the larger diameter ends of the pistons 28. As shown in FIG. 1, the internal threading of bore 20 in casing 10 is commensurate with the threaded portion of member 34. However, as may be seen from FIG. 3, it is not necessary to partially thread the bore 20 and the internal threads may thus extend to the outer ends of the bore. It is also to be noted that an O-ring seal 48 is provided to prevent leakage of system fluid from the annular chamber defined by section 44 of member 34. The seal 48 is disposed in a groove provided therefor on the outer surface of casing 10 and is compressed between the casing and the head 42 of member 34. It is also to be noted that heads 42 of members 34 are provided with threaded apertures for receiving screws 50, heads 42 thus providing a terminal for electrical conductors 52 and 52' and their respective terminations 54 and 54'.

As noted above, the contact assemblies also comprise differential area pistons 28 and 28' which are formed of a suitable conductive material. In the FIG. 1 embodiment, the ends of the pistons presenting the larger surface area are outwardly disposed. The smaller area, inner or facing ends of pistons 28 are provided with replaceable contacts. As shown, pistons 28 have, on their inner face, a conical silver contact 30 while the inner end of piston 28' has a silver contact 32 with a dished surface complementary to the shape of contact point 30.

The aforementioned valve member comprises an elongated stem having a first diameter portion 56 which functions in the manner to be described below as a closure member. The valve stem also has a second diameter portion 58 which is externally threaded and which engages the complementary threads at the outer end of bore 26 in casing 10. The valve seat comprises a metal ring 60 which is positioned in the inner end of exit port 14 in abutting relationship to shoulder 18. The inner diameter of metal ring 60 is equal to external diameter of stem portion 56. Ring 60 is held in position in port 14 by means of a nylon washer 62 which is press fit into the bore. Washer 62 also provides electrical insulation between ring 60 and contact members 34, the contact members cooperating with shoulder 18 to prevent movement of ring 60 and washer 62. A second nylon washer 64 is press fit into the bore of port 14 at the opposite side of the contact members 34 as shown and insures electrical isolation of members 34 from a nipple threaded into exit port 14.

As will be obvious, the position of stem portion 56 relative to ring 18 defines the valve opening and thus controls the flow through exit port 14. As will be described below, the position of valve stem portion 56 dictates the operating point of the embodiment of FIG. 1. Adjustment of the position of valve stem portion 56 is accomplished through use of locking nut and washer 68 and 70 respectively. In order to prevent leakage of system fluid from casing 10 around the valve stem member, stem portion 56 is provided with a groove which receives an O-ring seal 72.

Before describing the operation of the embodiment of FIG. 1, a brief discussion of FIGS. 2A and 2B is believed to be in order. FIG. 2A is a perspective view of a possible end configuration for a valve stem member 56' which would cooperate with ring 60 to define the valve opening in the embodiment of FIG. 1. It is to be noted that the end of the valve stem member is provided with a radial, tapered cut 74. FIG. 2B represents a valve seat (metallic ring member 60) which may also be employed in the embodiment of FIG. 1. The ring 60' of FIG. 2B is provided with a wedge-shaped cut 76. Either stem portion 56' or ring 60' may be employed in the embodiment of FIG. 1 in place of the corresponding elements shown therein, but stem portion 56' and ring 60' will not ordinarily be used together. The purpose of cuts 74 and 76, respectively in stem portion 56' and ring 60' are to provide for fine adjustment of flow through the present invention as the valve is opened from the fully closed position.

In operation, the present invention is installed in a fluid conduit system by means of attaching suitable nipples to the threaded portions of inlet port 12 and exit port 14. Conductors 52 and 52' which are connected in a suitable alarm system, are thereafter connected to terminal members 34 by means of screws 50 and the alarm circuit is energized. At this time the valve of the present invention will be in the fully closed position and there will thus be no substantial flow through the device. As will be explained below, with a source of pressurized fluid connected to inlet port 12 and no flow through the device, the pistons 28 will be urged inwardly against the bias of springs 38 and contact points 30 and 32 will be forced against one another. The inward movement of pistons 28 occurs as a result of the fluid pressure exerted against the outer, large end of pistons 28 by fluid which, since it cannot pass through the valve, travels through the small diameter passages 22 and 24 and enters the cylinders 36 in members 34 via holes 46. With the contacts 30 and 32 urged against one another, an electrical circuit is completed through the device from conductor 52 to conductor 52' via contact member 34, spring 38, piston 28, piston 28' spring 38' and contact member 34'.

After connection in the fluid system, the valve of the present invention is opened, by means of loosening locking nut 68 and backing the valve stem away from the valve seat (ring 60) until the desired flow rate is achieved. The opening of the valve will, of course, relieve the pressure on the outer ends of pistons 28 and 28' since the fluid can now pass directly from input port 12 to exit port 14. Accordingly, under the action of biasing springs 38 and 38' contacts 30 and 32 will be separated and the malfunction warning established by the circuit comprising conductors 52 and 52' will be extinguished.

Should, for any reason, there be a malfunction in the system downstream of the exit port 14 which would call for a greater flow rate than initially selected via adjustment of the position of valve stem portion 56, an electrical circuit will again be established through the present invention. That is, should there be an increased demand for fluid by downstream equipment, since the greater flow rate cannot be achieved due to the setting of the valve stem of the present invention, the pressure at the inlet port 12. Since inlet port 12 is in communication with the outer or large ends of pistons 28 and 28' this pressure differential will cause the pistons to move toward one another against urging contacts 30 and 32 together to energize the alarm circuit.

Figure 5:
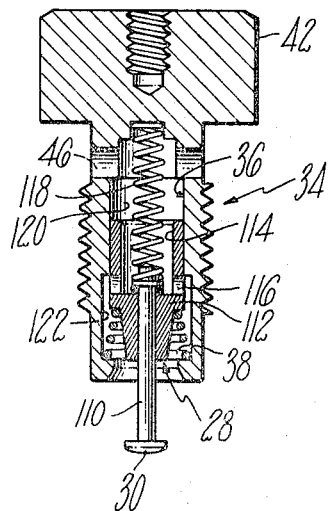
FIG. 5 is a cross-sectional, side elevation view of yet another contact assembly which may be employed in the embodiment of FIG. 1, the contact assembly of FIG. 5 providing for automatic flow adjustment.

A particularly advantageous feature of the present invention resides in the fact that the contact assemblies 34 may be readily removed and replaced with different assemblies, such as those shown in FIGS. 3—5, to achieve different modes of operation. Thus, considering FIG. 3, the contact assembly shown therein differs from those shown in FIG. 1 in that it employs a second biasing spring 80 which is positioned between the large end of piston 28 and the upper end of the cylinder 36 in member 34. The addition of spring 80 provides for improved sensitivity and also enhances the current carrying capabilities of the device since spring 38 does not have to carry the entire load. It is also to be noted that the embodiment shown in FIG. 3 employs a compressible washer 82 disposed between head 42 and body 10 to provide the sealing necessary to prevent leakage of system fluid from the chamber which surrounds the apertured portion of member 34 at the end of passage 22.

FIG. 4 depicts a contact assembly which enables the present invention to provide both minimum and maximum flow rate warnings. In the FIG. 4 embodiment, the termination 54 of conductor 52 is attached to the side of the contact member 34 via screw 50. Thus, in cases of abnormally high demand, the device operates as described above. The embodiment of FIG. 4 is also provided with a second, adjustable contact assembly comprising a conductive setscrew 90 having a contact 92 affixed to its inner end. Contact 92 and screw 90 are connected to a warning circuit via a conductor 94 and its end termination 96. Termination 96 is held in position on screw 90 by nut 98 and is insulated from the body of assembly 34 by means of an insulating washer 100. Leakage of system fluid from the upper end of cylinder 36 in assembly 34 and establishment of electrical contact between screw 90 and the body of assembly 34 is prevented by means of an internally threaded insulating bushing 102 which is press fit into the upper end of cylinder 36.

In operation, should the fluid demand imposed by the downstream equipment decrease below a preselected level, indicating a system malfunction, the pressure on the upper end of differential piston 28 will be insufficient to hold piston 28 against the bias imposed by spring 38 and the piston 28 will move outwardly against the contact 92. In order to enhance the area of contact between the piston 28 and contact 92, the end of piston 28 is provided with a recess 104 which receives contact 92. The point (flow rate) at which the piston will come against the contact point 92 is, of course, adjustable by means of setscrew 90. When the piston 28 and contact 92 are urged together an electrical circuit will be completed between conductors 52 and 94 via the body of assembly 34, spring 38, piston 28, contact 92 and setscrew 90. By employing a pair of the contact assemblies of FIG. 4, a redundant warning system can be provided. Alternatively, by employing a pair of the FIG. 4 assemblies and separately adjusting the setscrews 90 to provide for different contact closing points, sequential pretrip and trip warning indications can be obtained. It is to be noted that the small or inwardly disposed end of piston 28 is provided with a contact 30 in the form of a button rather than a point as disclosed in the embodiments of FIGS. 1 and 3. Contact button 30 of FIG. 4 is received in a hole provided therefor in the end of piston 28 and the contact and hole may be provided with complementary threads to facilitate contact replacement.

As in the case of the embodiment of FIGS. 1 and 3, the contact assembly shown in FIG. 5 permits a warning to be energized in response to demand above the level chosen by the initial setting of the valve stem 56. However, the contact assembly of FIG. 5 operates without starving the downstream equipment of the fluid thus demanded. The foregoing is achieved by employing a hollow, apertured piston. Thus, the piston 28 comprises an inwardly disposed smaller portion 110 which carries the contact member 30. Member 110 passes through and is movable relative to a larger diameter portion 112 of the piston. Piston portion 112 has, at its upper end, a tubular section which defines an open ended cylindrical section 114. At the base of cylindrical section 114, i.e. where it joins the main piston portion 112, the piston is provided with a plurality of holes 116 which pass through the walls of section 114. In order to minimize wear, piston portion 112 and its cylindrical extension 114 are comprised of a material such as nylon or Teflon. Electrical connection between the walls of the contact element 34 and the contact 30 is achieved via a spring 118 which extends between the head 42 of the contact assembly and the outer end of conductive, small diameter piston portion 110; the outer end of piston portion 110 extending through portion 112 and into cylindrical portion 114. The cylinder 36 formed in contact assembly 34 of the FIG. 5 embodiment has a first diameter portion 120 which is commensurate with the outer diameter of cylindrical piston extension 114. Cylinder 36 has a second portion 122 which has a larger diameter than section 120.

In operation, when a pressure differential is established across the piston, the entire assembly will move downwardly, as the assembly is shown in FIG. 5, until such time as contact 30 comes against a contact 30' on an oppositely disposed assembly. Thereafter, while further movement of the smaller diameter portion 110 of the piston is prevented, the larger diameter section 112 of the piston will continue to move downwardly until such time as the apertures 116 in the cylindrical extension 114 clear the smaller diameter portion 120 of cylinder 36 in assembly 34. At this time, fluid entering the cylinder 34 via apertures 46 can pass through the cylinder and out the bottom of the contact assembly via apertures 116 thereby supplying the increased demand. Thus, a malfunction warning will be achieved but the downstream equipment will not be starved for fluid as a result of the functioning of the warning device.

While preferred embodiments have been shown and described, various modifications and substitutions may be made thereto without departing from the spirit and scope of the present invention. Thus, for example, elements of the contact assemblies of FIGS. 1 and 3—5 may be intermingled without the exercise of invention on the part of others. Accordingly, it is to be understood that the present invention has been described by way of illustration and not limitation.

I claim:
1. A fluid flow rate detector comprising:
   a casing, said casing defining a fluid flow path between an entrance and an exit in the casing and an internal chamber having fluid communication with one point of the fluid flow path between the entrance and the exit whereby the chamber is exposed to the fluid pressure at the one point of the flow path;
   first electrical contact means mounted in said casing and extending into the internal chamber, said first contact means including a first piston movable along a given direction within the chamber;
   second electrical contact means mounted in said casing and extending into the internal chamber, said second contact means including a second piston alined with said first piston and movable along the given direction within the chamber, the second electrical contact means being electrically insulated in the casing from the first electrical contact means;
   means normally biasing the inwardly disposed ends of said first and second pistons out of contact with one another; and
   means including passages formed in said casing for delivering fluid from the entrance of said casing to the outwardly disposed ends of said pistons whereby the opposing force of said biasing means may be overcome and said piston inwardly disposed ends urged together.

2. The fluid flow rate detector of claim 1 in which the casing is made of an insulating material and thereby provides the electrical insulation in the casing between the first and second electrical contact means.

3. The apparatus of claim 1 further comprising valve means disposed in said casing flow path between the entrance and the one point of the fluid flow path, said valve means permitting adjustment of the fluid flow rate through said casing.

4. The apparatus of claim 3 wherein said pistons and biasing means are formed of conductive material and a first electrical circuit condition is established between said first and second contact means when said pistons are urged together.

5. The apparatus of claim 4 wherein at least one of said contact means comprises:
   a conductive outer member, said outer member including a tubular section which extends into said chamber and defines a cylinder, the inner end of said cylinder being comprised of a radially inwardly directed flange;
   a differential area piston disposed for movement within said cylinder, said piston having a large diameter section disposed outwardly with respect to said chamber and a small diameter section which extends inwardly past said flange, the junction of said piston sections defining a shoulder; and
   a plurality of apertures in said tubular section, said apertures being located adjacent the outer end of said tubular section and providing communication between the interior of said cylinder and said fluid delivering passages.

6. The apparatus of claim 5 wherein said biasing means comprises spring means disposed in said cylinder and extending between said flange and piston shoulder.

7. The apparatus of claim 6 wherein said valve means comprises:
   a valve seat positioned in said casing and in said flow path, said valve seat having an aperture for the passage of fluid therethrough; and
   a valve stem extending into said casing and cooperating with said seat.

8. The apparatus of claim 6 further comprising second spring means extending between the outwardly disposed end of said cylinder and the end of said large diameter piston section.

9. The apparatus of claim 6 further comprising third electrical contact means extending into said cylinder, said third contact means being insulated from said conductive outer member, a second electrical circuit condition being established by physical contact between said third contact means and said large diameter piston section.

10. A flow indicator comprising:

a casing comprised of nonconductive material, said casing having an inlet port and an exit port which communicates with said inlet port, said ports defining a flow path through said casing;

a pair of oppositely disposed electrical contact assemblies mounted in said casing, said contact assemblies each including;

a conductive outer member having a tubular section, said tubular section being oriented transversely of said flow path and having a plurality of apertures therein adjacent the end thereof which is disposed outwardly from said flow path;

a conductive piston disposed for movement in said tubular section, said piston having an extension which passes out of said tubular section and intersects said flow path; and spring means biasing said piston outwardly with respect to said flow path;

means placing said inlet port in fluid communication with the apertures in said tubular sections of said outer members;

an apertured valve seat disposed in said casing flow path upstream of the point of intersection of said piston extensions therewith; and a valve stem mounted in said casing and cooperating with the aperture in said valve seat to regulate the flow through said casing.

11. The apparatus of claim 10 wherein said pistons comprise:

a first section; and a second section having a larger cross-sectional area than said first section, said first section extending into said flow path and said second section having an end facing outwardly toward the apertured portion of said tubular section.

12. The apparatus of claim 10 wherein said valve stem has an angular, radial cut in the end thereof which cooperates with said seat.

13. The apparatus of claim 10 wherein said valve seat comprises a metal ring, said ring having a Vee groove formed in the upstream facing surface thereof.

14. The fluid flow rate detector of claim 13 wherein the said one point of the fluid flow path is adjacent the said exit.

PO-1050
(5/69)

UNITED STATES PATENT OFFICE
CERTIFICATE OF CORRECTION

Patent No. __3,546,405__  Dated __December 8, 1970__

Inventor(s) __Raymond Carignan__

It is certified that error appears in the above-identified patent and that said Letters Patent are hereby corrected as shown below:

IN THE SPECIFICATION:
    Column 1, line 27, after "for" insert --detecting--
    Column 1, line 50, after "point" insert --for--
    Column 2, line 54, change "by" to --of--
    Column 4, line 5, change "end" to --ends--
    Column 4, line 30, change "the" to --a--
    Column 4, line 32, after "pressure" insert --in the exit port 14 will decrease relative to the pressure--

IN THE CLAIMS:
    Claim 14, line 1 (column 8, line 21) change "13" to --1--

SIGNED AND
SEALED
MAR 9 1971

(SEAL)
Attest:

Edward M. Fletcher, Jr.
Attesting Officer

WILLIAM E. SCHUYLER,
Commissioner of Patent